July 8, 1958     C. TODD     2,842,344
BORDER FENCE
Filed March 12, 1956
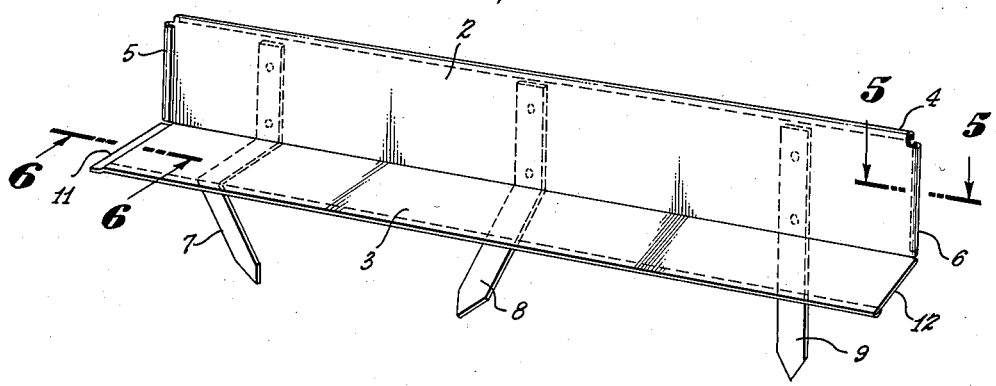
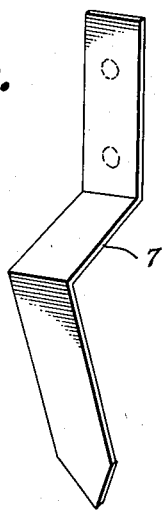
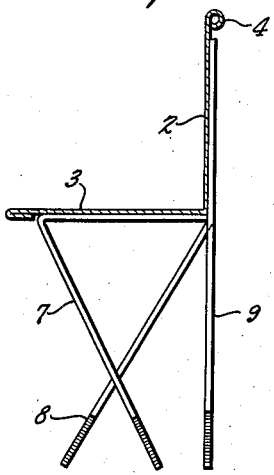
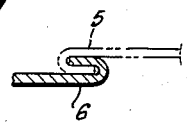
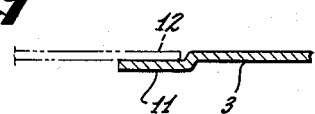
CHARLES TODD,
INVENTOR.
Huebner, Beehler,
Worrel & Herzig.
Attorneys.
BY:

United States Patent Office 2,842,344
Patented July 8, 1958

2,842,344
BORDER FENCE

Charles Todd, Los Angeles, Calif.

Application March 12, 1956, Serial No. 571,059

3 Claims. (Cl. 256—21)

My invention relates to an improved fence or edging strip for bordering, protecting and beautifying the exteriors of private and public property along gardens, lawns, walks and shrubbery.

A satisfactory border fence or edging strip for gardens, lawns, paths, etc., should be simple in construction so that it can be produced at low cost. It should be capable of convenient installation. The installed fence should be rigid and substantial, and it should be securely anchored to discourage thieves or vandals from making off with it. Furthermore, the installed fence should be attractive in design to add to the natural beauty of the grounds, as well as protect and preserve the grounds and the plant growth thereon.

Accordingly, it is an important object of my invention to provide a border fence of the type discussed above which is simple in construction and capable of mass production at low cost.

Another object is to provide a border fence that is readily installed but is permanently anchored by stakes providing a ground interlock to prevent thieves or vandals from removing the fence.

A further object is to provide a border fence having the quality of being rigid and substantial as well as attractive and effective in beautifying and protecting the grounds and its plant growth.

Additional objects will become apparent from the following description:

In general terms, my invention comprehends a border fence comprising an elongate horizontal strip attached at one of its elongate edges to an elongate vertical strip to form a substantially L-shaped elongate fence. One of the stakes employed to anchor the fence is attached to the fence and extends downwardly therefrom at an angle to the vertical. Another such stake also extends downwardly at an angle to the vertical to produce a ground interlock, and thus securely anchor the fence. The angles of the two stakes preferably face in opposite directions to produce a more effective ground interlock.

A description of a specific embodiment of my invention is given with reference to the drawing, wherein:

Figure 1 is a perspective view showing an assembled border fence;

Figure 2 is a partial perspective view showing one of the stakes employed in anchoring the fence;

Figure 3 is a similar view showing another of the stakes employed in anchoring the fence;

Figure 4 is a vertical sectional view showing the relationship of the stakes to the fence;

Figure 5 is a partial cross-sectional view taken on the line 5—5 of Figure 1 showing a detail of an end-to end joint of adjacent vertical portions of the fence; and Figure 6 is a similar view taken on the line 6—6 of Figure 1 showing a detail of an end-to-end joint of adjacent horizontal portions of the fence.

In the drawing 2 designates the vertical body portion of my edging strip or fence. This vertical body portion includes a horizontal base 3. Base 3 is at right angles to the vertical body portion and makes the body portion rigid. The rigidity of the body portion eliminates the necessity of trimming grass at the edges of the base portion. Numeral 4 designates a tubular rim at the top of the vertical body portion. The rim is tubular for safety reasons and strengthens the body portion. Numerals 5 and 6 designate extended ends for connecting other sections of the fence to the ends thereof.

Numeral 7 designates a stake which is attached to the body portion 2 of the fence at spaced intervals and is driven into the ground to anchor the fence. Numeral 8 designates another stake which also is attached to the body portion of the fence and driven into the ground to anchor the fence. The stakes 7 and 8 will make the fence rigid and hold it fast when it is installed. The stakes 7 and 8 are designed so that when the fence is installed their arrangement is such that no two stakes of identical shape are placed adjacent to each other. This arrangement results in a form of locking which makes it necessary that the fence be disassembled before it is removed. This feature serves as a protection against theft. A straight auxiliary stake 9 may also be used to additionally anchor and strengthen the fence, if desired.

It will be observed that one of the stakes 7 has its upper end portion secured to the vertical body portion of the fence or edging strip, has its intermediate portion offset and lying under and parallel to the horizontal body portion of the fence, and has its lower end portion directed downwardly at an acute angle to the vertical. The other stake 8 also has its upper end portion secured to the vertical body portion of the fence, but has its intermediate and lower end portions directed downwardly at an acute angle to the vertical and in a direction opposite to the direction of the lower end portion of stake 7. The acute angles of stakes 7 and 8 serve to provide a ground interlock. It is preferable to have the acute angles face in opposite directions, but it is not necessary that this be the case in situations where a maximum of ground interlock is not required.

Numerals 11 and 12 designate end portions of the horizontal portions 3 of the fence. It will be observed in Figures 5 and 6 that the vertical portions 2 of the fence are interlocked at end portions 5 and 6 to make a joint, while end portions 11 and 12 of the horizontal portion 3 overlap at their end portions to form a joint.

The fence or edging strip of my invention can be made of metal, and can be painted various colors and in a variety of designs. These designs may be checks, squares, lattice-work, discs, circles, diamonds, imitation rock or brick, and the like. The fence is made from two inches to twelve inches high to serve the different sizes of plants. It may be used for bordering flowers, hedges, walks, bushes, shrubbery, trees, lawns, gardens, trailer houses and buildings.

The fence or edging strip of my invention is economical because it is easy to manufacture and install. With a little care, it will last indefinitely. It keeps fertilizer, soil and moisture close to the plants. It saves time and money by eliminating grass trimming. By conserving the moisture in the soil, it reduces the amount of watering required. It protects the roots of plants from intense heat of the sun. It also protects plants from injury by trespassers.

It is understood that the specific embodiment of my invention shown and described above is to be taken as a preferred example of the same, and that various changes in shape, size and arrangements of parts may be resorted to without departing from the spirit of my invention or the scope of the appended claims.

Having thus described my invention, I claim:

1. A border fence comprising an elongate vertical strip, an elongate horizontal strip attached at one of its elongate edges to the vertical strip to form a substantial L-shaped elongate fence, a first stake attached to the fence and extending downwardly therefrom at an acute angle to the vertical, and a second stake attached to the fence and extending downwardly therefrom at an acute angle to the vertical said stakes extending downwardly from opposite edges of said elongate horizontal strip.

2. A border fence according to claim 1, wherein the acute angles of the first and second stakes face in opposite directions.

3. An edging strip for the borders of lawns, plant beds, and the like, comprising a substantially L-shaped elongate section having a vertical flange adapted to provide an ornamental and shielding element for a planted area along which the strip extends, and having a horizontal flange adapted to lie flush against a ground support to strengthen and steady the vertical flange in a normal position of verticality, the improvement comprising a plurality of longitudinally spaced stakes having upper end portions respectively secured to the strip in laterally spaced relation, and lower end portions respectively depending from the strip and adapted to be forced into the ground, selected of said stakes having their lower end portions directed downwardly and laterally under said horizontal flange from positions adjacent the angle of the L, and other of said stakes having their lower portions directed downwardly and laterally under said horizontal flange from points spaced outwardly along said horizontal flange to provide a ground interlock by means of said stakes, and means at the ends of said strip for securing the same releasably to other similar vertical flanges.

References Cited in the file of this patent

UNITED STATES PATENTS 2,713,751     Hendrixson _____ July 26, 1955

FOREIGN PATENTS 215,529     Great Britain _____ May 15, 1924